United States Patent [19]

St. John

[11] 4,130,838

[45] Dec. 19, 1978

[54] SPEED CONTROL APPARATUS FOR SCANNING SYSTEM

[75] Inventor: Robert P. St. John, Marina Del Rey, Calif.

[73] Assignee: Xerox Corporation, Stamford, Conn.

[21] Appl. No.: 823,812

[22] Filed: Aug. 11, 1977

[51] Int. Cl.² .................................... H04N 1/36
[52] U.S. Cl. .................................... 358/267; 318/78; 350/6.7; 350/285; 358/206; 358/285
[58] Field of Search .................... 358/267, 206, 285; 350/7, 285; 318/78

[56] References Cited

U.S. PATENT DOCUMENTS

| | | | |
|---|---|---|---|
| 2,263,641 | 11/1941 | Nicolson | 358/267 |
| 3,809,976 | 5/1974 | Bessire | 318/78 |
| 3,848,087 | 11/1974 | Carrell | 358/264 |

OTHER PUBLICATIONS

*Product Engineering,* May 1975, pp. 29–31, "Frequency Controlled ac Motors Challenge dc Drives at Lower hp."

*Primary Examiner*—Howard W. Britton
*Attorney, Agent, or Firm*—Barry Paul Smith; Leonard Zalmer

[57] ABSTRACT

Apparatus for controlling the rotational speed of a polygonal mirror adapted to scan a reflected light beam over a desired scanning area as each facet of the mirror is rotated into the path of an incident light beam. The apparatus comprises a poly-phase motor coupled to the mirror for driving same. The motor has a plurality of input terminals and a plurality of motor windings connected to the input terminals. First means responds to the reflected light beam for generating a first clock signal having a frequency proportional to the actual rotational speed of the mirror. Second means generates a second clock signal having a frequency proportional to a desired rotational speed of said mirror. Third means coupled to the first and second means responds to the first and second clock signals for generating a third clock signal having a frequency representative of the difference in phase or frequency between the first and second clock signals. A poly-phase generator is coupled to the third means and is responsive to the third clock signal for generating a plurality of mutually phase-displaced drive signals for respective application to the plurality of input terminals of the motor, whereby a plurality of mutually phase-displaced sinusoidal signals are respectively developed across the motor windings, each sinusoidal signal having a frequency proportional to the frequency of the third clock signal.

18 Claims, 6 Drawing Figures

SPEED CONTROL APPARATUS FOR SCANNING SYSTEM

BACKGROUND OF THE INVENTION

This invention relates to scanning systems and, more particularly, to speed control apparatus for scanning systems.

U.S. Pat. No. 3,848,087 discloses a scanning system utilizing a polygonal mirror for scanning a reflected light beam over a scanning area as each facet of the mirror is rotated into the path of an incident light beam. Conventional analog servo control techniques are employed to control the rotational speed of a drive motor to which the mirror is connected. The motor appears to be a conventional d-c motor.

U.S. Pat. No. 3,809,976 and an article entitled *Frequency Controlled AC Motors Challenge DC Drives at Lower HP* that appeared in the May, 1975 issue of Product Engineering at pages 29–31 both disclose frequency control of three-phase a-c motors. The article sets forth a number of advantages in using frequency controlled a-c motors over conventional d-c motors.

It would be desirable to provide in a scanning system of the general type disclosed in U.S. Pat. No. 3,848,087 a more effective and efficient method of controlling the rotational speed of the polygonal mirror.

SUMMARY OF THE INVENTION

In furtherance of such desirability, apparatus is provided for controlling the rotational speed of a polygonal mirror adapted to scan a reflected light beam over a desired scanning area as each facet of the mirror is rotated into the path of an incident light beam, said apparatus comprising a poly-phase motor coupled to said mirror for driving same, said motor having a plurality of input terminals and a plurality of motor windings connected to said input terminals, first means responsive to said reflected light beam for generating a first clock signal having a frequency proportional to the actual rotational speed of said mirror, second means for generating a second clock signal having a frequency proportional to a desired rotational speed of said mirror, third means coupled to said first and second means and responsive to said first and second clock signals for generating a third clock signal having a frequency representative of the difference in phase or frequency between said first and second clock signals, and a poly-phase generator coupled to said third means and responsive to said third clock signal for generating a plurality of mutually phase-displaced drive signals for respective application to the plurality of input terminals of said motor, whereby a plurality of mutually phase-displaced sinusoidal signals are respectively developed across said motor windings, each sinusoidal signal having a frequency proportional to the frequency of said third clock signal.

These and other aspects and advantages of the present invention will be more completely described below with reference to the accompanying drawings.

DESCRIPTION OF AN EXEMPLARY EMBODIMENT

Figure 1:
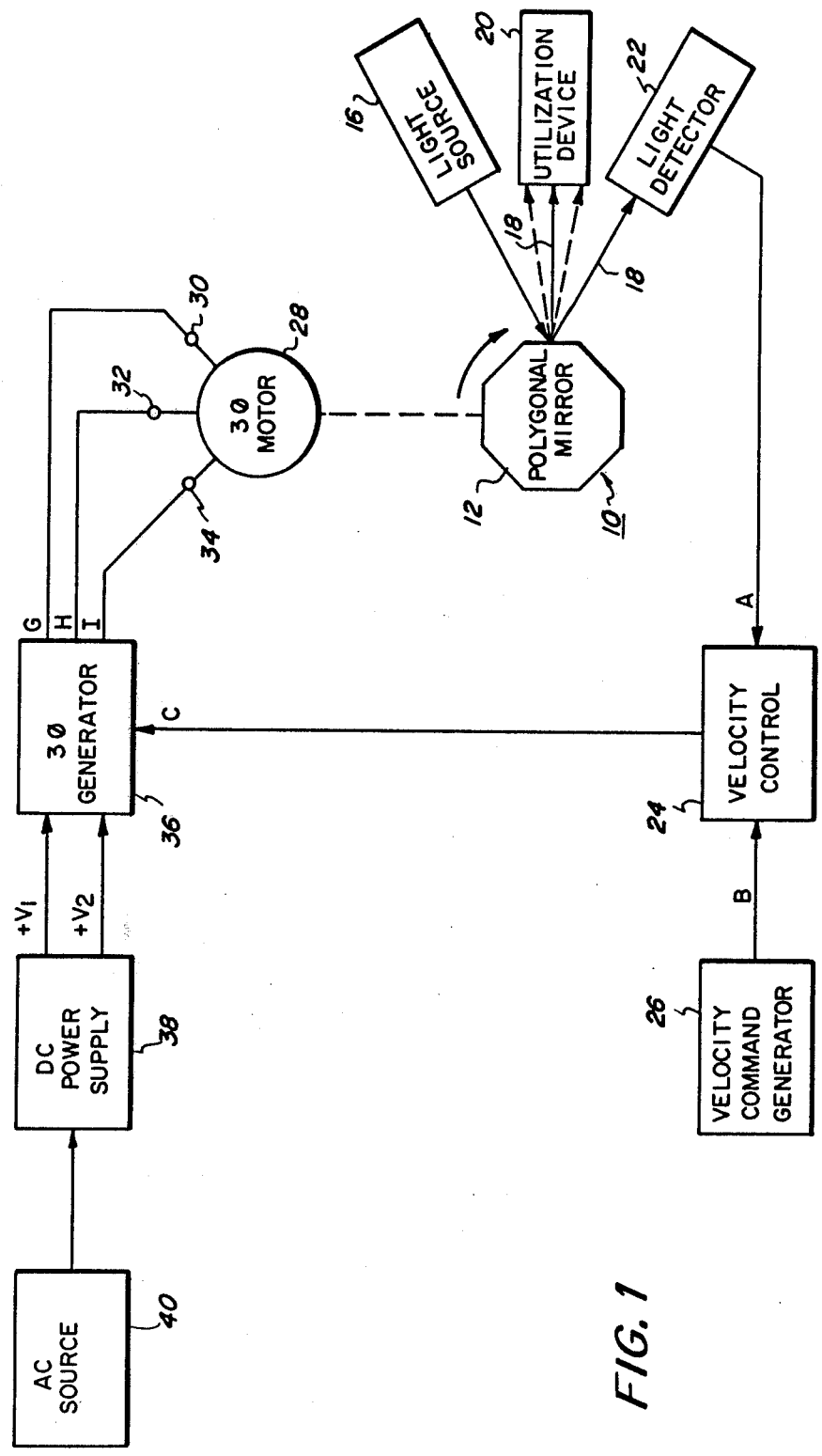
FIG. 1 is a functional block diagram representation of a scanning system including the speed control apparatus of the present invention therein.

Referring to FIG. 1, a scanning system is shown comprising a polygonal mirror 10 having a desired number of facets 12 about its periphery. By way of example only, the mirror 10 is shown as having eight facets, although obviously any number may be employed. A particularly preferred number of facets is between 24 and 36. As shown, the facets 12 are desirably planar, although curvilinear facets could also be employed.

The mirror facets 12 are adapted to be selectively rotated into the path of an incident light beam 14 generated by any suitable light source 16. A presently preferred light source is a laser. The reflected light beam 18 is made to scan a predetermined area in a recycling manner due to rotation of the mirror 10. The scanning speed is, of course, a function of the rotational speed of the mirror 10, and the number of scan cycles per unit time is a function of the number of facets 12 on the mirror 10. The area being scanned may be included in a utilization device 20. Such device 20 may, by way of example, include a xerographic processing machine (not shown) where the area being scanned could be the surface of a xerographic drum (not shown). Obviously, any other utilization device capable of utilizing the scanning reflected light beam 18 may be employed.

During each scanning pass or cycle, the reflected light beam not only scans across the scanning area in device 20, but also is directed to a light detector 22 when each mirror facet 12 is rotated into a predetermined position. The light detector 22 may be of any suitable conventional type capable of generating a clock pulse signal A having a pulse frequency proportional to the actual rotational speed of the mirror 10. Preferably, the clock pulse signal A has a number of pulses per each revolution of the mirror 10 equal to the number of facets 12 on the mirror. With the light source 16 preferably being a laser, the clock pulse signal A would have the form shown in FIG. 5. As light detectors capable of generating such clock pulse signal are entirely well known in the art, specific details of light detector 22 will not be described herein.

Figure 5:
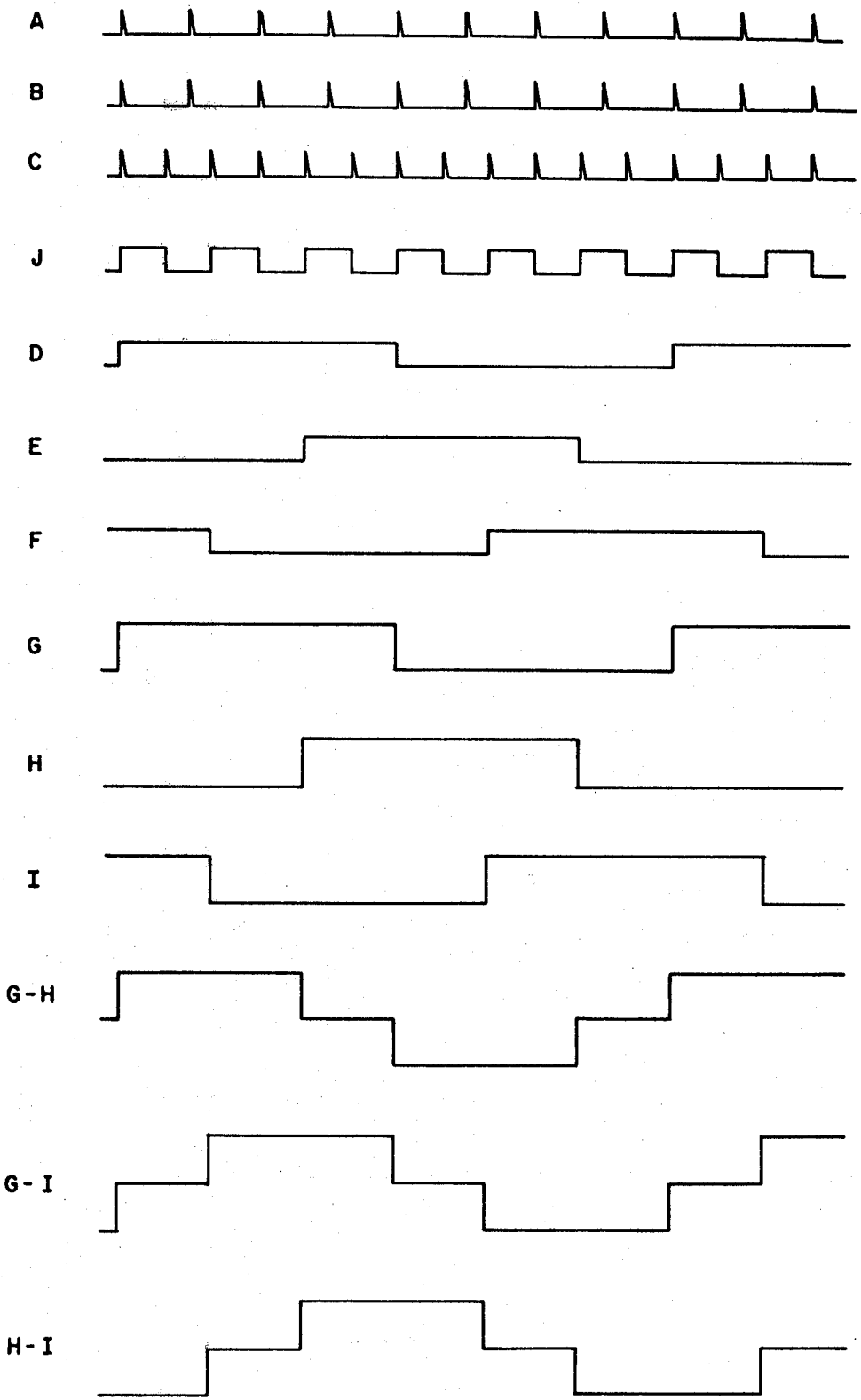
FIG. 5 represents the waveforms for various signals developed in the apparatus of the invention as depicted in FIGS. 1–4.

Still referring to FIG. 1, the clock pulse signal A from the light detector 22 is applied to one input of a velocity control circuit 24. The circuit 24 has another input adapted to receive another clock pulse signal B generated by a velocity command generator 26. The clock pulse signal B has a frequency proportional to a desired rotational speed of the mirror 10 at any instant of time. An exemplary waveform for clock pulse signal B is shown in FIG. 5. Purely for ease of depicting the various waveforms in FIG. 5, the signal B is shown in FIG. 5 at the same frequency as signal A, i.e. the mirror 10 10 is rotating at the desired speed.

In accordance with a presently preferred embodiment, the velocity control circuit 24 compares the relative phase of the clock pulse signals A and B and generates a control clock pulse signal C in response to such comparison. The frequency of clock pulse signal C is representative of the difference in phase between the signals A and B. More specifically, if there is no difference in phase between clock pulse signals A and B at the time of comparison (as is depicted in FIG. 5), then the signal C will be at a predetermined constant frequency, whereas if there is a difference in phase between the signals A and B, then signal C will be adjusted to have a frequency that will change the speed of the mirror 10 to the desired rotational speed. Details of the preferred velocity control circuit 24 will be described below in connection with FIG. 4.

As shown in FIG. 1, the mirror 10 is connected to and driven by a poly-phase motor 28, which is desirably a three-phase a-c motor. The motor 28 has three input terminals 30, 32 and 34 for respectively receiving three drive signals G, H and I. The nature of these three drive signals and the manner of their generation will be described below. As is conventional in three-phase a-c motors, the motor 28 includes three windings (not shown) that may be connected to the three input terminals in either a "Delta" or "Wye" configuration. For purposes of the description to follow, a "Delta" configuration shall be assumed. Thus, the three motor windings are respectively connected between associated pairs of the terminals 30, 32 and 34. One winding is connected between terminals 30 and 32, another between terminals 30 and 34, and the last between terminals 32 and 34. The drive signals G, H and I are generated from respective outputs of a three-phase generator 36. The generator 36 receives a pair of positive d-c voltages $+V_1$ and $+V_2$ from a suitable d-c power supply 38 connected to an a-c source 40.

In order to understand the nature of drive signals G, H and I, the generator 36 will now be described in detail with reference to FIG. 2. As shown, the clock pulse signal C from the velocity control circuit 24 is applied to an electrooptical isolation circuit 42 included in the generator 36. The circuit 42 is of conventional nature and includes a light-emitting-diode (LED) $D_1$ across which the clock pulse signal C is applied, and a light-sensitive-diode $D_2$ in light communication with LED, $D_1$. The cathode of diode $D_2$ is connected to the d-c voltage $+V_1$ and the anode is connected to the base of a transistor $T_1$. The emitter of transistor $T_1$ is grounded and the collector is connected through an amplifier 45 to the clock input of a flip-flop 44. The collector is also connected to the supply voltage $+V_1$ through a load resistor $R_1$. The purpose of circuit 42 is to isolate the power supply 38, generator 36 and motor 28 from the rest of the system, including most proximately the velocity control circuit 24. In this manner, the need for a separate isolation transformer in the power supply 38 is unnecessary.

In accordance with the preferred embodiment, the frequency of the clock pulse signal C applied at circuit 42 is twelve times the controlled rotational speed of the motor 28 and thus mirror 10. By "controlled rotational speed" it is meant the speed of the motor 28 that is directly determined and defined by the frequencies of signals G-H, G-I and H-I (FIG. 5) respectively developed across the three motor windings. The controlled rotational speed would equal the desired rotational speed only when the frequency of signal C is representative of no difference in phase between the signals A and B. This concept and the manner in which signals G-H, G-I and H-I are derived will be described in more detail below.

Now then, the optically isolated clock signal C at the collector of transistor $T_1$ is applied to the clock input of the flip-flop 44 which is connected as a "divide-by-two" circuit. Specifically, the set (S) and Reset (R) inputs are grounded and the $\overline{Q}$ output is fedback to the data (D) input. The signal J developed at the $\overline{Q}$ output will, therefore, have a frequency equal to one-half that of the clock pulse signal C, i.e. six times the controlled rotational speed of the motor 28.

The generator 36 further includes three additional flip-flops 46, 48 and 50. These flip-flops are each so-called "D" flip-flops, as was flip-flop 44. Each of the flip-flops 44, 46, 48 and 50 is constructed in a manner such that when the clock input thereof goes high, the state of the data input will be transmitted to the Q output. Referring first to flip-flop 48, the set and reset terminals thereof are grounded and the clock input is connected to the Q output of flip-flop 44 for receiving signal J therefrom. The data input of flip-flop 48 is connected to the $\overline{Q}$ output of flip-flop 50. Signals E and $\overline{E}$ (FIG. 5) are respectively developed at the Q and $\overline{Q}$ outputs of flip-flop 48 and are applied to a driver 52 which develops the signal H in a manner to be described below. The Q output of flip-flop 48 is further connected to an "anti-lock-up" circuit 54 also to be described below.

Referring now to flip-flop 50, the set and reset terminals are grounded and the clock input is connected to the Q output of flip-flop 44 for receiving the signal J therefrom. The data input is connected to the $\overline{Q}$ output of flip-flop 46. Signals F and $\overline{F}$ (FIG. 5) are respectively developed at the Q and $\overline{Q}$ outputs of flip-flop 50 for application to a driver 54 identical to driver 52 which generates the drive signal I. The Q output is also connected to circuit 54 and the $\overline{Q}$ output to the data input of flip-flop 48, as mentioned above.

With respect to flip-flop 46, the set and reset terminals are grounded and the clock input is connected to the Q output of flip-flop 44. The data input is connected to the output of anti-lock-up circuit 54 and signals D and $\overline{D}$ (FIG. 5) are respectively developed at the Q and $\overline{Q}$ outputs for application to a driver 56 identical to drivers 52 and 54. Driver 56 generates the drive signal G. The Q output of flip-flop 46 is also connected to the circuit 54 and the $\overline{Q}$ output to the data input of flip-flop 50, as mentioned above.

As shown in FIG. 5, the signals D, E and F are mutually phase-displaced by 120°. The same is true with respect to the complement signals $\overline{D}$, $\overline{E}$ and $\overline{F}$. This relationship is reliably insured through use of the anti-lock-up circuit 54. More specifically, if the D input of flip-flop 46 was connected directly to the $\overline{Q}$ output of the flip-flop 48, a problem would arise if all three flip-flops 46, 48 and 50 were at the same state during start-up. In this event, all three would simultaneously change state. The signals D, E and F would remain in phase. The use of anti-lock-out circuit 54 eliminates this problem.

Figure 2:
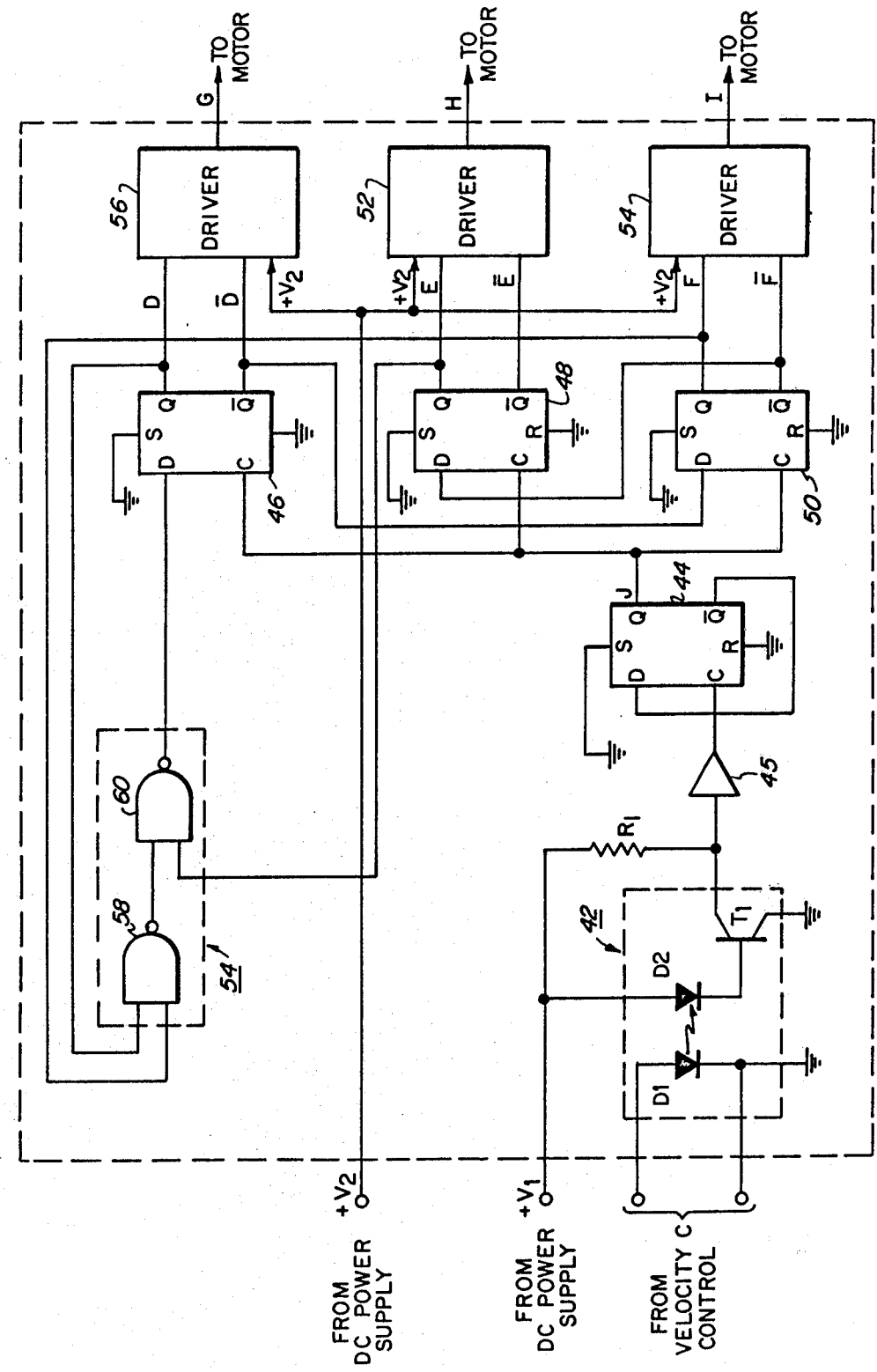
FIG. 2 is a more detailed circuit diagram of the three-phase generator depicted in FIG. 1.

Referring still to FIG. 2, the anti-lock-up circuit 54 includes a pair of NAND-gates 58 and 60. One input of the NAND-gate 58 is connected to the Q output of flip-flop 46 for receiving signal D therefrom and the other input is connected to the Q output of flip-flop 50 for receiving the signal F therefrom. Only when both inputs to gate 58 (signals D and F) are high will the output be low. Otherwise, the output will be high. Such output is connected to one input of the NAND-gate 60, the other input of which connected to the Q output of flip-flop 48 for receiving the signal E therefrom. Only when both the output of gate 58 and signal E are high will the output of gate 60 be low.

The circuit 54 operates as follows. By way of example, assume upon start-up that all three flip-flops 46, 48 and 50 are high. This will cause the output of gate 58 to be low and the output of gate 60 to be high. Consequently, at the next signal J clock pulse, the flip-flop 46 will stay high, whereas the flip-flops 48 and 50 will go low since the previous states of signals $\overline{F}$ and $\overline{D}$ were low. Simultaneous change of state is thus avoided and the proper phase relationship among the signals D, E and F will be developed.

The constitution of each of the drivers 52, 54 and 56, which as stated above are identical, will now be described with reference primarily to FIG. 3 which depicts the driver 56. By way of review, the driver 56 receives the signals D and $\overline{D}$ from flip-flop 46, as well as the d-c voltage $+V_1$ from power supply 46. Similarly, the driver 52 receives the signals E and $\overline{E}$ from flip-flop 48 and the supply voltage $+V_2$, and the driver 54 receives the signals F and $\overline{F}$ from flip-flop 50 and the supply voltage $+V_2$.

Figure 3:
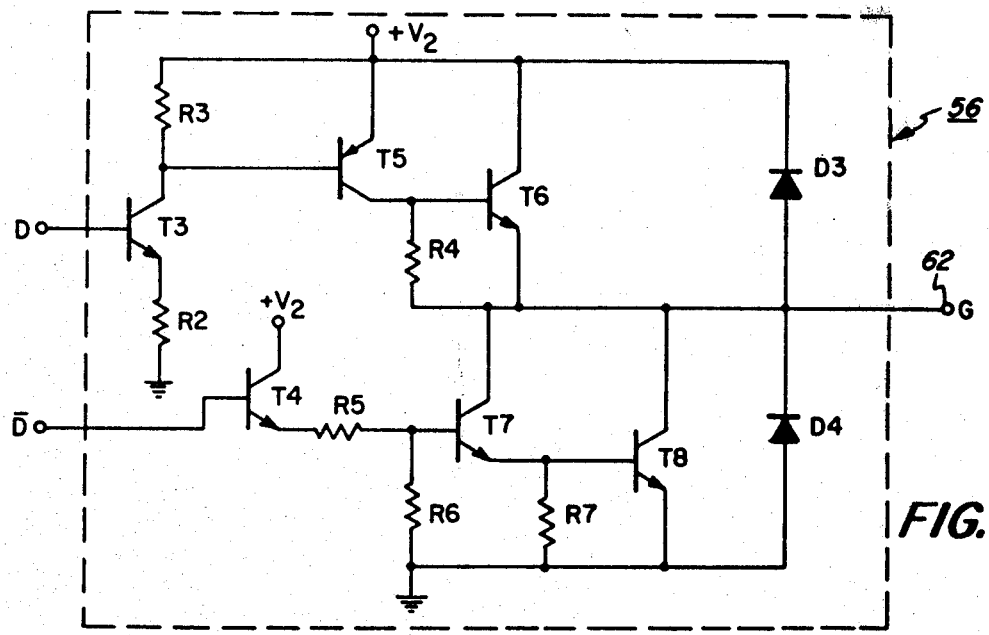
FIG. 3 is a more detailed circuit diagram of the drivers depicted in FIG. 2.

As shown in FIG. 3, the driver 56 includes a pair of input transistors $T_3$ and $T_4$ for respectively receiving the signals D and $\overline{D}$ at their base electrodes. The emitter electrode of transistor $T_3$ is grounded through a resistor $R_2$. The collector electrode is connected to the base of another transistor $T_5$ and through a resistor $R_3$ to the supply voltage $+V_2$. The emitter electrode of transistor $T_5$ is connected directly to source voltage $+V_2$, and the collector electrode is connected to the base of another transistor $T_6$ and through a resistor R4 to the output terminal 62 of the driver 56 at which the drive signal G is developed. The collector electrode of transistor T6 is connected to the source voltage $+V_2$, and the emitter electrode is connected to terminal 62. A diode D3 is connected in clamping relation between the emitter and collector electrodes of transistor T6.

The collector electrode of transistor T4 is connected to source voltage $+V_2$, and its emitter electrode is coupled through a resistor R5 to the base electrode of a transistor T7 and through the resistor R5 and another resistor R6 to ground. The collector electrode of transistor T7 is connected to the output terminal 62, and the emitter electrode is connected to ground through a resistor R7 and to the base electrode of a transistor T8. The collector electrode of transistor T8 is connected to the terminal 62, and its emitter electrode is grounded. A diode D4 is connected in clamping relation between the emitter and collector electrodes of transistor T8. It should be noted that the purpose of diodes D3 and D4 is to prevent voltage excursions greater than $+V_2$ or less than ground as the result of the inductive load in the motor windings.

As made clear in FIG. 5, driver 56 essentially amplifiers the signal D (at high voltage level $+V_1$) to signal G (at high voltage level $+V_2$). The frequencies of signals D and G are identical. The drivers 52 and 54 develope signals H and I in an identical manner (see FIG. 5).

With the three-phase motor 28 connected in "Delta" configuration, it will be apparent that the signals G and H are added across one motor winding (signal G-H), the signals G and I are added across another motor winding (signal G-I), and the signals H and I are added across the third motor winding (signal H-I). These three signals are shown in FIG. 5 where it will be noted that they are each synthesized sine-waves having a frequency equal to 1/12 that of signal C, wherein the three signals are mutually phase-displaced by 120°. If the motor 28 were connected in "Wye" configuration, then the signal G-H would be developed across one "composite winding" defined by the serial combination of the two windings respectively connected to the motor terminals adapted to receive the signals G and H. The signals G-I and H-I would be developed in a similar manner relative to the two other "composite windings" in the "Wye" configured motor.

Figure 4:
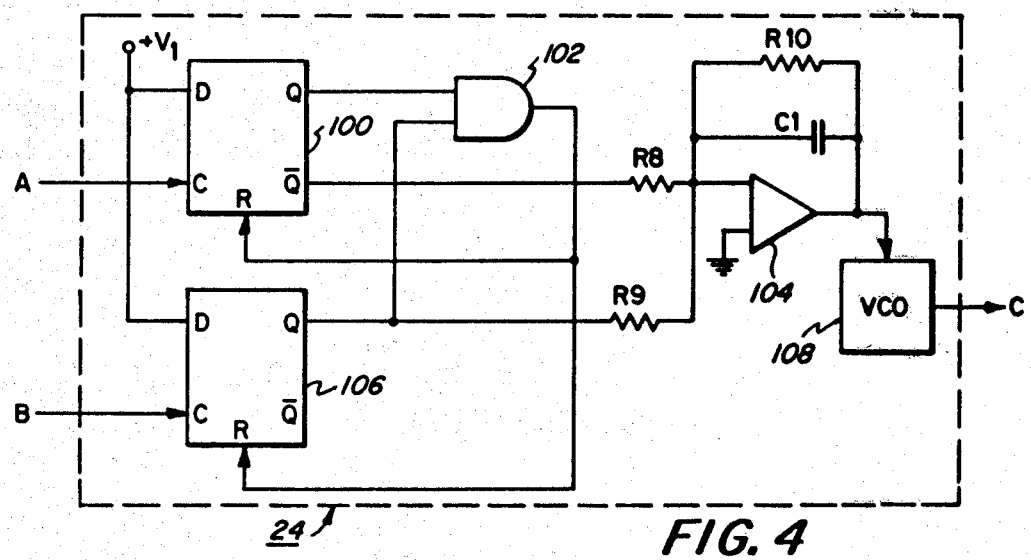
FIG. 4 is a schematic block diagram of the velocity control circuit shown in FIG. 1.

Referring now to FIG. 4, a preferred velocity control circuit 24 (FIG. 1) will be described. As shown, the velocity circuit 24 includes a "D" flip-flop 100 wherein the data input is connected to potential $+V_1$. The clock input is connected to the light detector 22 (FIG. 1) for receiving clock pulse signal A therefrom. The Q output of flip-flop 100 is connected to one input of an AND-gate 102. The Q output is connected through a resistor R8 to one input of an operational amplifier 104. The other input of the amplifier 104 is grounded.

Another "D" flip-flop 106 has its data input connected to potential $+V_1$ and its clock input connected to the velocity command generator 26 (FIG. 1) for receiving the clock pulse signal B therefrom. the Q output is connected to a second input of the AND-gate 102, whose output is connected to the reset inputs of flip-flops 100 and 106. The Q output of flip-flop 106 is also connected through a resistor R9 to the non-grounded input of the operational amplifier 104. The resistors R8 and R9 are preferably matched for reasons to be discussed below. The output of the amplifier 104 is fedback to such non-grounded input through an R-C circuit comprised of a resistor R10 in parallel with a capacitor C1. Additionally, the output of the amplifier 104 is connected to a conventional voltage-controlled-oscillator (VCO) 108 for controlling the frequency of the clock pulse signal C that is generated at the output of the VCO 108.

In operation, let us first assume that the clock pulse signals A and B are at the same frequency and are in phase, as shown in FIG. 5. Since the data inputs of both flip-flops 100 and 106 are tied high, the simultaneous occurrence of A and B pulses will set flip-flops 100 and 106 high. However, since the Q outputs of these flip-flops will be high, the output of AND-gate 102 will go high thereby immediately resetting the flip-flops 100 and 106. In this event, the high level voltage developed across resistor R8 will be summed with the low level voltage developed across the resistor R9. Since the resistors R8 and R9 are matched, the average of the voltage applied across the resistors will be amplified by the amplifier 104 with the resultant output signal applied as a control voltage to the VCO 108. The control voltage is preestablished at a reference level such that the output of the VCO 108 will be at a nominal frequency (FIG. 5) when the signals A and B are at the same frequency and in phase.

Now then, suppose signal A leads in phase signal B, whether or not these frequencies are the same. In this event, the flip-flop 100 will be set at a time when flip-flop 106 is not set. The gate 102 will not reset the flip-flop 100 until the flip-flop 106 is set upon the later occuring B pulse. During the time when flip-flop 100 is set and flip-flop 106 is not set, the voltage applied to the non-grounded input of the amplifier 104 will be the average of a low level voltage across resistor R8 and a low level voltage across resistor R9. This will result in an input voltage to the amplifier 104 less than the referenced level. The control voltage output of amplifier 104 will correspondingly be greater than the nominal level in the sample above. The VCO responds to this greater voltage levely by proportionately decreasing the frequency of the clock pulse signal C. This will result in a lowering of the frequency of clock pulse signal A (actual rotational speed of the motor 28) tending to reduce the phase differential between clock pulse signals A and B and eventually establishing phase correspondence.

Lastly, suppose that signal B leads signal A in phase. Flip-flop 106 will then be set first. During the time when flip-flop 106 is set and flip-flop 100 is not set, the voltage applied to the non-grounded input of the amplifier 104 will be the average of a high level voltage developed across resistor R8 and a high level voltage developed across resistor R9. This will result in an input voltage to the amplifier 104 greater than the reference level. The control voltage output of amplifier 104 will correspondingly be less than the nominal level. The VCO responds to this lower voltage level by proportionately increasing the frequency of the clock pulse signal C tending to reduce the phase differential between signals A and B. The VCO 108 contains appropriate circuitry (not shown) for achieving the desired results set out above.

It will be appreciated that the use of three discrete voltage level inputs to the amplifier 104 is merely exmplary (i.e. (1) high across R8 + high across R9, (2) high across R8 + low across R9, (3) low across R8 + low across R9). Other similar summation circuits could be used, including those having more than three voltage levels.

Figure 6:
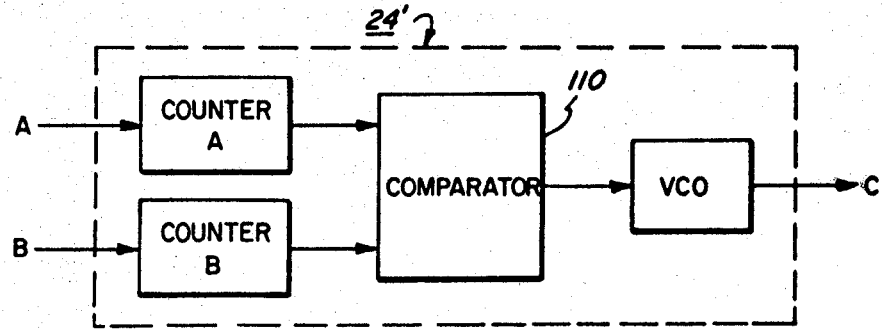
FIG. 6 is a schematic block diagram of an alternative velocity control circuit for use in the apparatus of FIG. 1.

Although the invention has been described with respect to a presently preferred embodiment, it will be appreciated by those skilled in the art that various modifications, substitutions, etc. may be made without departing from the spirit and scope of the invention as defined in and by the following claims. By way of one example only, the velocity control circuit 24 need not be limited to phase comparison to develope a control voltage for a VCO. Frequency comparison techniques could also be employed. Referring to FIG. 6, by way of example, the clock pulse signals A and B could be applied to respective counters A and B. Counters A and B could each be arranged to count pulses up to a predetermined amount before resetting. Then, if counter A reset before counter B, the frequency of signal A would be greater than that of signal B, and vice versa. Each counter A and B would have its output connected to a comparator 110. The comparator 110 could include conventional circuitry for developing a control voltage output dependent upon the frequency differential between signals A and B, as measured by the counters A and B. In this arrangement, the comparator would be set to count a predetermined number of counts of the lower frequency signal past the point in time of the high frequency signal resetting its counter.

As another example, the motor 28 is shown as being driven in one direction defined by the sequence in which the signals G, H and I are raised, i.e. first G, then H and then I (see FIG. 5). It will be appreciated that the flip-flops 44, 46, 48 and 50 could be appropriately reconnected such that signal I would be raised first, then signal H, and then signal G, thereby causing reverse motor rotation. The same effect could be achieved by using a plurality of controlled inverters at the outputs of the drivers 56, 52 and 54.

What is claimed is:

1. Apparatus for controlling the rotational speed of a polygonal mirror adapted to scan a reflected light beam over a desired scanning area as each facet of the mirror is rotated into the path of an incident light beam, said apparatus comprising:
   a poly-phase motor coupled to said mirror for driving same, said motor having a plurality of input terminals and a plurality of motor windings connected to said input terminals;
   first means responsive to said reflected light beam for generating a first clock signal having a frequency proportional to the actual rotational speed of said mirror;
   second means for generating a second clock signal having a frequency proportional to a desired rotational speed of said mirror;
   third means coupled to said first and second means and responsive to said first and second clock signals for generating a third clock signal having a frequency representative of the difference in phase between said first and second clock signals; and
   a poly-phase generator coupled to said third means and responsive to said third clock signal for generating a plurality of mutually phase-displaced drive signals for respective application to the plurality of input terminals of said motor, whereby a plurality of mutually phase-displaced sinusoidal signals are developed across said motor windings, each sinusoidal signal having a frequency proportional to the frequency of said third clock signal.

2. The apparatus of claim 1, wherein the frequency of said third clock signal is variable in correspondence with a difference in phase existing between said first and second clock signals, and is constant when no difference in phase exists between said first and second clock signals.

3. The apparatus of claim 1, wherein there are three input terminals, three motor windings connected in "Delta" configuration with respect to said input terminals, and three mutually phase-displaced sinusoidal signals respectively developed across said three motor windings.

4. The apparatus of claim 3, wherein each drive signal is a square-wave signal and each sinusoidal signal is synthesized by adding the pair of drive signals applied at either terminal of the corresponding motor winding.

5. The apparatus of claim 1, wherein said poly-phase generator is further responsive to a predetermined d-c voltage for setting the maximum voltage level of each of said drive signals.

6. The apparatus of claim 5, further comprising a d-c power supply responsive to an a-c source voltage for generating said predetermined d-c voltage for application to said poly-phase generator.

7. The apparatus of claim 1, wherein said motor and said generator are each three-phase.

8. The apparatus of claim 1, wherein said poly-phase generator includes a main circuit portion at which said drive signals are generated, and electro-optical isolation means for applying said third clock signal to said main circuit portion.

9. The apparatus of claim 1, wherein said poly-phase generator includes means for insuring that said plurality of drive signals are mutually phase-displaced.

10. Apparatus for controlling the rotational speed of a polygonal mirror adapted to scan a reflected light beam over a desired scanning area as each facet of the mirror is rotated into the path of an incident light beam, said apparatus comprising:
- a poly-phase motor coupled to said mirror for driving same, said motor having a plurality of input terminals and a plurality of motor windings connected to said input terminals;
- first means responsive to said reflected light beam for generating a first clock signal having a frequency proportional to the actual rotational speed of said mirror;
- second means for generating a second clock signal having a frequency proportional to a desired rotational speed of said mirror;
- third means coupled to said first and second means and responsive to said first and second clock signals for generating a third clock signal having a frequency representative of the difference between the frequencies of said first and second clock signals; and
- a poly-phase generator coupled to said third means and responsive to said third clock signal for generating a plurality of mutually phase-displaced drive signals for respective application to the plurality of input terminals of said motor, whereby a plurality of mutually phase-displaced sinusoidal signals are developed across said motor windings, each sinusoidal signal having a frequency proportional to the frequency of said third clock signal.

11. The apparatus of claim 10, wherein the frequency of said third clock signal is variable in correspondence with a difference existing between the frequencies of said first and second clock signals, and is constant when no difference exists between the frequencies of said first and second clock signals.

12. The apparatus of claim 10, wherein there are three input terminals, three motor windings connected in "Delta" configuration with respect to said input terminals, and three mutually phase-displaced sinusoidal signals respectively developed across said three motor windings.

13. The apparatus of claim 12, wherein each drive signal is a square-wave signal and each sinusoidal signal is synthesized by adding the pair of drive signals applied at either terminal of the corresponding motor winding.

14. The apparatus of claim 10, wherein said poly-phase generator is further responsive to a predetermined d-c voltage for setting the maximum voltage level of each of said drive signals.

15. The apparatus of claim 14, further comprising a d-c power supply responsive to an a-c source voltage for generating said predetermined d-c voltage for application to said poly-phase generator.

16. The apparatus of claim 10, wherein said motor and said generator are each three-phase.

17. The apparatus of claim 10, wherein said poly-phase generator includes a main circuit portion at which said drive signals are generated, and electro-optical isolation means for applying said third clock signal to said main circuit portion.

18. The apparatus of claim 10, wherein said poly-phase generator includes means for insuring that said plurality of drive singals are mutually phase-displaced.

* * * * *